(12) United States Patent
May

(10) Patent No.: US 7,917,788 B2
(45) Date of Patent: Mar. 29, 2011

(54) SOC WITH LOW POWER AND PERFORMANCE MODES

(75) Inventor: Marcus W. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1007 days.

(21) Appl. No.: 11/789,760

(22) Filed: Apr. 25, 2007

(65) Prior Publication Data

US 2008/0104434 A1    May 1, 2008

(51) Int. Cl.
  *G06F 1/00*   (2006.01)
  *G06F 1/26*   (2006.01)
  *G06F 1/32*   (2006.01)
  *F02P 3/02*   (2006.01)

(52) U.S. Cl. ......... 713/322; 713/300; 713/320; 323/371

(58) Field of Classification Search .................. 713/300, 713/320, 322; 323/371
  See application file for complete search history.

(56) References Cited

U.S. PATENT DOCUMENTS

| | | |
|---|---|---|
| 5,784,584 A | 7/1998 | Moore et al. |
| 5,809,336 A | 9/1998 | Moore et al. |
| 6,420,858 B1 * | 7/2002 | Kitagawa et al. ............. 323/282 |
| 6,424,549 B1 * | 7/2002 | Gattavari et al. ................ 363/89 |
| 6,598,148 B1 | 7/2003 | Moore et al. |
| 6,677,804 B2 * | 1/2004 | Pekny .......................... 327/535 |
| 7,227,423 B2 * | 6/2007 | McCorquodale et al. .... 331/179 |
| 2007/0168908 A1 * | 7/2007 | Paolucci et al. ............... 717/100 |
| 2008/0077818 A1 * | 3/2008 | Rauschmayer et al. ....... 713/400 |

OTHER PUBLICATIONS

Sigmatel STMP35xx Product Data Sheet version 1.03, Sep. 17, 2003, pp. 4, 10, 18, 43, 88, 244.*
Sigmatel STMP3600 Product Brief, Sigmatel Mixed-Signal Multimedia Semiconductors, 2 pages.

* cited by examiner

*Primary Examiner* — Ji H Bae
(74) *Attorney, Agent, or Firm* — Ingrassia Fisher & Lorenz, P.C.

(57) ABSTRACT

A system on a chip includes a processing module, ROM, RAM, and a clocking circuit. The clock circuit is coupled to produce a first clock signal when the SOC is in a low power mode and to produce a second clock signal when the SOC is in a performance mode, where the first clock signal is less accurate than the second clock signal. The clock circuit consumes more power when producing the second clock signal than when producing the first clock signal.

14 Claims, 5 Drawing Sheets

SOC WITH LOW POWER AND PERFORMANCE MODES

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to mixed signal integrated circuits and more particularly to multiple clocking modes of a system on a chip.

2. Description of Related Art

In general, a system on a chip (SOC) integrates multiple independent circuits, which are typically available as individual integrated circuits, on to a single integrated circuit. For example, an audio processing SOC combines a processing core (e.g., microprocessor and/or digital signal processor, instruction cache, and data cache), an audio codec (e.g., digitization of analog audio input signals and converting digitized audio signals into analog output signals), a clock circuit, a high speed serial interface (e.g., universal serial bus (USB) interface), and an external memory interface.

The clock circuit of an audio processing SOC typically includes an oscillation circuit and a phase locked loop (PLL). The oscillation circuit generates a reference oscillation from an off-chip crystal and the PLL generates one or more clock signals from the reference oscillation. Many applications of the audio processing SOC (e.g., music file playback, file transfers via the USB interface, etc.) require a highly accurate clock. Thus, the oscillation circuit and the PLL are designed to provide the highly accurate clock for these operating conditions, which comes with the cost of power consumption.

There are, however, many low power operating conditions of an audio processing SOC that do not require a highly accurate clock (e.g., USB suspend mode, fast start sleep modes, etc.). Since there is only one clock circuit on the audio processing SOC, the highly accurate clock is used and the corresponding power is consumed. In the low power operating modes, the power consumption of the system can be dominated by circuitry generating accurate clock frequencies, voltage references, etc.

Therefore, a need exists for a system on a chip (SOC) that includes a low power mode and a performance mode to reduce power consumption of the SOC.

BRIEF DESCRIPTION OF THE SEVERAL VIEWS OF THE DRAWING(S)

DETAILED DESCRIPTION OF THE INVENTION

Figure 1:
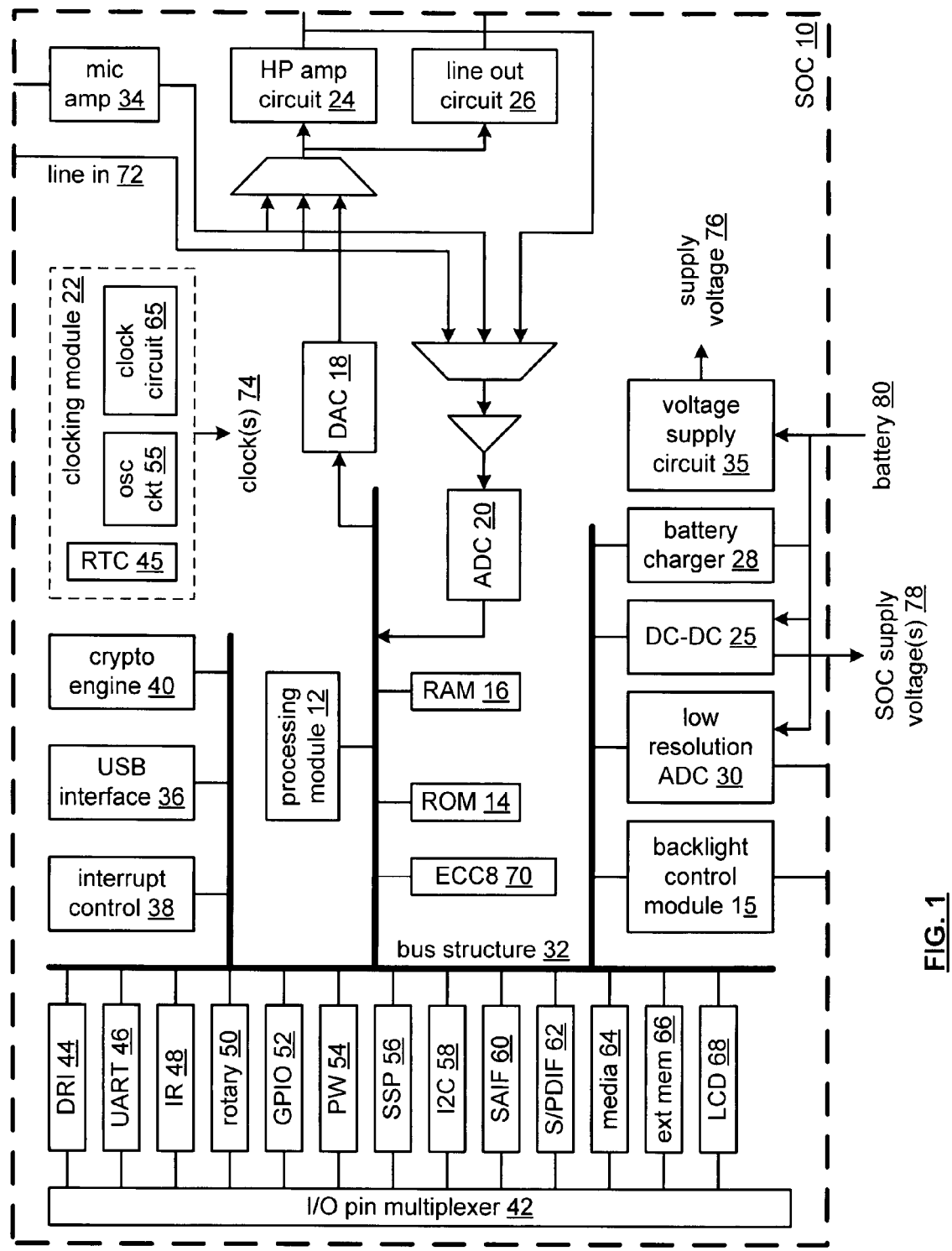
FIG. 1 is a schematic block diagram of a system on a chip (SOC) in accordance with the present invention.

FIG. 1 is a schematic block diagram of a system on a chip (SOC) 10 that may be used in a portable entertainment device (e.g., an MP3 player, an advanced MP3 player (i.e., music, photos, and video playback), cellular telephones, personal computers, laptop computers, and/or personal digital assistants. The SOC 10 includes at least some of a processing module 12, read only memory (ROM) 14, a backlight control module 15, random access memory (RAM) 16, a digital to analog conversion (DAC) module 18, an analog to digital conversion (ADC) module 20, a clocking module 22, a headphone (HP) amplifier circuit 24, a DC-DC converter 26, a line out circuit 26, a battery charger 28, a low resolution ADC 30, a bus structure 32, a microphone amplifier 34, a universal serial bus (USB) interface 36, an interrupt controller 38, a crypto engine 40, an input/output pin multiplexer 42, a plurality of interface modules 44-68, an ECC8 module 70, and a line in pin 72.

The clocking module 22 includes one or more of a real time clock (RTC) module 45, an oscillation circuit 55, and a clock circuit 65. In one embodiment, the oscillation circuit 55 is coupled to an off-chip crystal and produces therefrom an oscillation. The clock circuit 65 may use the oscillation as a reference oscillation to produce one or more clock signals 74 that are used by at least some of the other blocks of the SOC. The RTC module 45 provides timing functions such as a second counter, a programmable millisecond interrupt, an alarm interrupt and power-up facility, a watchdog reset, and storage and access to persistent registers.

The plurality of interface modules 44-68 includes at least some of a digital recording interface (DRI) interface 44, a universal asynchronous receiver-transmitter (UART) interface 46, an infrared (IR) interface 48 (e.g., IrDA), a rotary controller 50, a general purpose input/output (GPIO) interface 52, a pulse width (PW) interface 54, a security software provider (SSP) interface 56, an I2C interface 58, a serial audio input (SAIF) transmit and/or receive interface 60, a Sony Philips Digital Interface (SPDIF) 62, a media interface 64, an external memory interface 66, and a liquid crystal display (LCD) interface 68. In an application, the DRI interface 44 may be used to interface with a stereo FM (frequency modulated) receiver; the UART interface 46 may be used to interface with a host device and/or be used to debug the SOC; the IR interface 48 may be used to provide peer-to-peer IR communication; the pulse width interface 54 may be used in connection with the backlight control module 15 to control backlighting of a display and/or to provide an output beep; the SSP interface 56 may be used to interface with off-chip devices having one or more of an multimedia card (MMC) interface, a scientific data (SD) interface, a secure digital input/output (SDIO) interface, a consumer electronics-AT attachments (CE-ATA) interface, a Triflash interface, a serial peripheral interface (SPI), and a master software (MS) interface; the S/PDIF interface 62 may be used to interface with off-chip devices having an S/PDIF transmit and/or receive interface; the media interface 64 may be used to interface with a hard drive, NAND flash or compact flash to transceiver digitized audio, video, image, text, and/or graphics data; the external memory interface 66 may be used to interface with an SDRAM, a NOR memory, and/or a dual data rate (mDDR) memory device; and the LCD interface 68 may be used to interface with a display.

The DC-DC converter 25, which may be a buck and/or boost converter, generates one or more SOC supply voltages 78 from a battery 80. For example, the DC-DC converter 25 may produce a 1.2 V supply voltage, a 1.8 V supply voltage, and a 3.3 V supply voltage. Note that the DC-DC converter 25 may use a single off-chip inductor to produce the SOC supply voltages 78. Further note that when the SOC 10 is receiving power from a source other than the battery 80 (e.g., 5 V from a USB connection), the DC-DC converter 25 may generate one or more the SOC voltages from the alternative power source. When the alternate power source is available, the battery charger 28 may be enabled to charge the battery 80.

In operation, the processing module 12 coordinates the recording, playback, and/or file management of multimedia data (e.g., voice, audio, text, data, graphics, images, and/or video). The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 12 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 12 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-7.

In a playback mode of operation, the processing module 12 coordinates the retrieval of multimedia data from off-chip memory via one of the interfaces 44, 48, 52, 56, 60, 62, 64, and/or 66. The retrieved data is routed within the SOC via the bus structure 32, which may include a peripheral bus and an advanced high-performance bus (AHB). If the retrieved data is encrypted, the crypto engine 40 decrypts the retrieved data to produce decrypted retrieved data. If the decrypted retrieved data is encoded (e.g., is an MP3 file, WMA file, MPEG file, JPEG file, etc.), the processing module 12 coordinates and/or performs the decoding of the retrieved data to produce digitized data. An audio component of the digitized data is provided to the DAC module 18, which may include one or more digital to analog converters. The DAC 18 converts the digitized audio component into analog audio signals. The headphone amplifier circuit 24 and the line out circuit 26 provide the analog audio signals off-chip. A video or image component of the digitized data is provided to the LCD interface for display.

In an audio record mode, the processing module 12 coordinates the storage of analog audio input signals received via the microphone amplifier 34 or the line input 72. In this mode, the ADC module 20 converts the analog audio input signals into digitized audio signals which are then placed on the bus structure. In one embodiment, the processing module 12 may coordinate the storage of the digitized audio signals in an off-chip memory device. In another embodiment, the processing module 12 coordinates and/or performs encoding (e.g., MP3, WMA, etc.) of the digitized audio signals to produce encoded audio signals, which are subsequently stored in off-chip memory.

In a file management mode, the processing module 12 coordinates the transferring, editing, and/or deleting of files (e.g., MP3 files, WMA files, MPEG files, JPEG files, and/or any other type of music, video and/or still image files) with a host device via the USB interface 36. For example, the host device (e.g., a laptop or PC) may download a music file to the portable entertainment device that includes the SOC 10 via the USB interface 36. The USB interface 36 places the music file on the bus structure 32 and it is routed to the desired destination under the control of the processing module 12. Note that the interrupt control module 38 facilitates the various modes of operation by processing interrupts, providing timers, and direct memory access.

Figure 2:
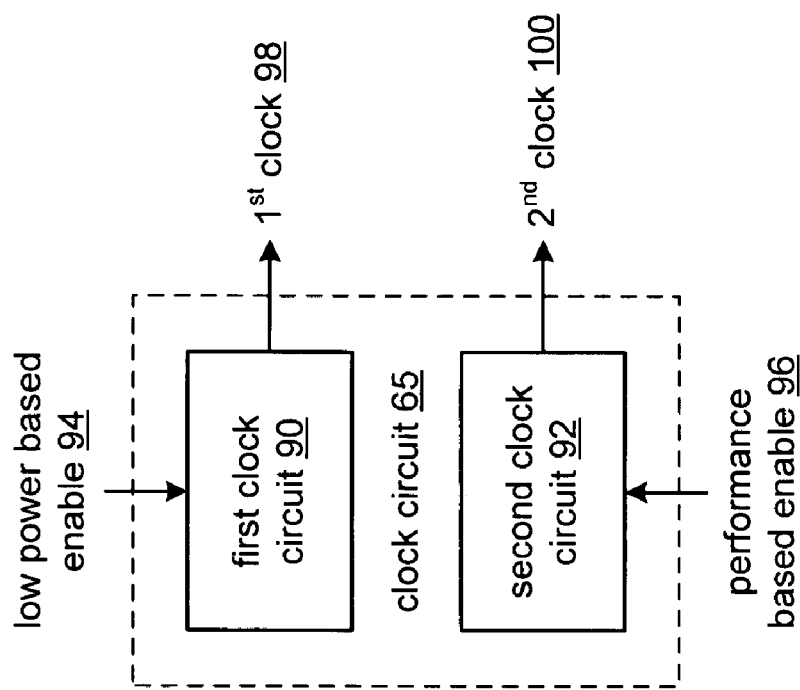
FIG. 2 is a schematic block diagram of an embodiment of a clock circuit in accordance with the present invention.

FIG. 2 is a schematic block diagram of an embodiment of a clock circuit 65 that produces a first clock signal 98 when the SOC is in a low power mode (e.g., USB suspend, fast boot sleep mode, etc.) and to produce a second clock signal 100 when the SOC is in a performance mode (e.g., music file playback, file transfer via the USB interface, etc.). The clock circuit 65 generates the first clock signal 98 to be less accurate than the second clock signal 100, but consumes more power when producing the second clock signal 100 than when producing the first clock signal 98.

In this embodiment, a first clock circuit 90 may produce the first clock signal 98 when the SOC is in a low power mode 94 and a second clock circuit 92 may produce the second clock signal 100 when the SOC is in a performance mode. The first clock circuit 90 may be implemented using a variety of clock circuit topologies including, but not limited to, a ring oscillator circuit, an inductor-capacitor resonating oscillator circuit, counters, and a resistor-capacitor oscillator circuit. The second clock circuit 92 may also be implemented using a variety of clock circuit topologies including, but not limited to, a crystal oscillator circuit, a phase locked loop, and a counter based oscillator circuit.

Figure 3:
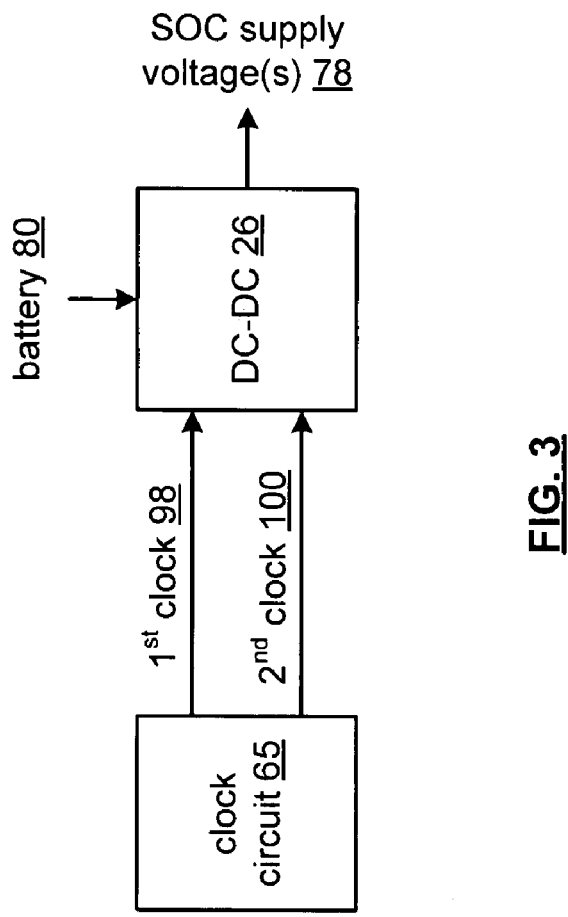
FIG. 3 is a schematic block diagram of a clock circuit coupled to a DC-DC converter in accordance with the present invention.

FIG. 3 is a schematic block diagram of a clock circuit 65 coupled to a DC-DC converter 26. In this illustration, the clock circuit 65 is providing the first or the second clock signal 98 or 100 to the DC-DC converter 26 depending on whether the SOC is in the low power mode or the performance mode. In this embodiment, the DC-DC converter 25 produces the SOC power supply voltage 78 from battery 80 based the first clock signal 98 when the SOC is in the low power mode and based on the second clock signal 100 when the SOC is in the performance mode.

Figure 4:
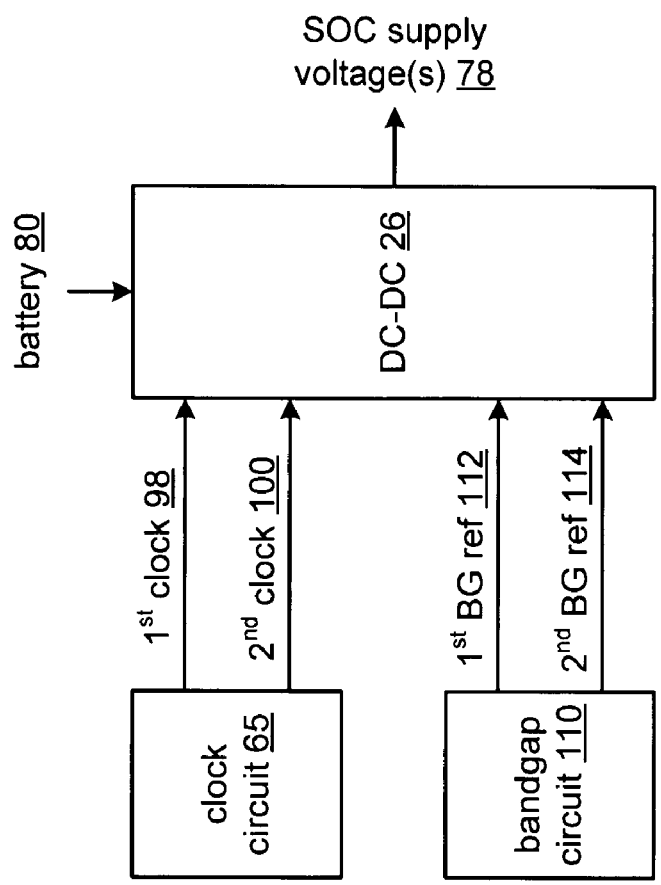
FIG. 4 is a schematic block diagram of an embodiment of a clock circuit and an embodiment of a bandgap circuit coupled to a DC-DC converter in accordance with the present invention.

FIG. 4 is a schematic block diagram of an embodiment of a clock circuit 65 and an embodiment of a bandgap circuit 110 coupled to a DC-DC converter 25. In this embodiment, the clock circuit 65 provides the first clock signal 98 to the DC-DC converter 25 when the SOC is in the low power mode and provides the second clock signal 100 to the DC-DC converter when the SOC is in the performance mode.

In addition, the bandgap circuit 110 provides the first bandgap reference 112 to the DC-DC converter 25 when the SOC is in the low power mode and provides the second bandgap reference 114 to the DC-DC converter when the SOC is in the performance mode. In this embodiment, the first bandgap reference 112 is less accurate than the second bandgap reference 114, but the bandgap circuit 110 consumes more power when producing the second bandgap reference 114 than when producing the first bandgap reference 112. In this manner, when the SOC is in the low power mode, the low power bandgap reference 112 and the low power first clock signal 98 are produced, thereby reducing power consumption of the SOC 10.

Figure 5:
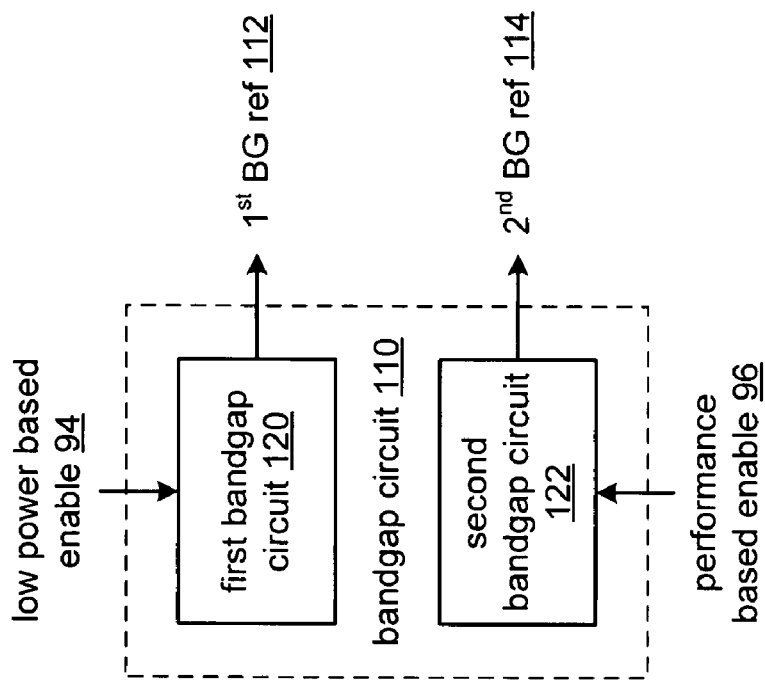
FIG. 5 is a schematic block diagram of an embodiment of a bandgap circuit in accordance with the present invention.

FIG. 5 is a schematic block diagram of an embodiment of a bandgap circuit 10 that includes a first bandgap circuit 120 and a second bandgap circuit 122. The first bandgap circuit 120 produces the first bandgap reference 112 when the first bandgap circuit is enabled and the second bandgap circuit produces the second bandgap reference 114 when the second bandgap circuit 122 is enabled, wherein the first bandgap circuit 120 is enabled when the SOC is in the low power mode and the second bandgap circuit 122 is enabled when the SOC is in the performance mode.

In one embodiment, the first bandgap circuit 120 may include a Zener diode coupled in series with a resistive element (e.g., a resistor, a biased transistor, etc.) while the second bandgap circuit 122 may be a conventional bandgap circuit.

Figure 6:
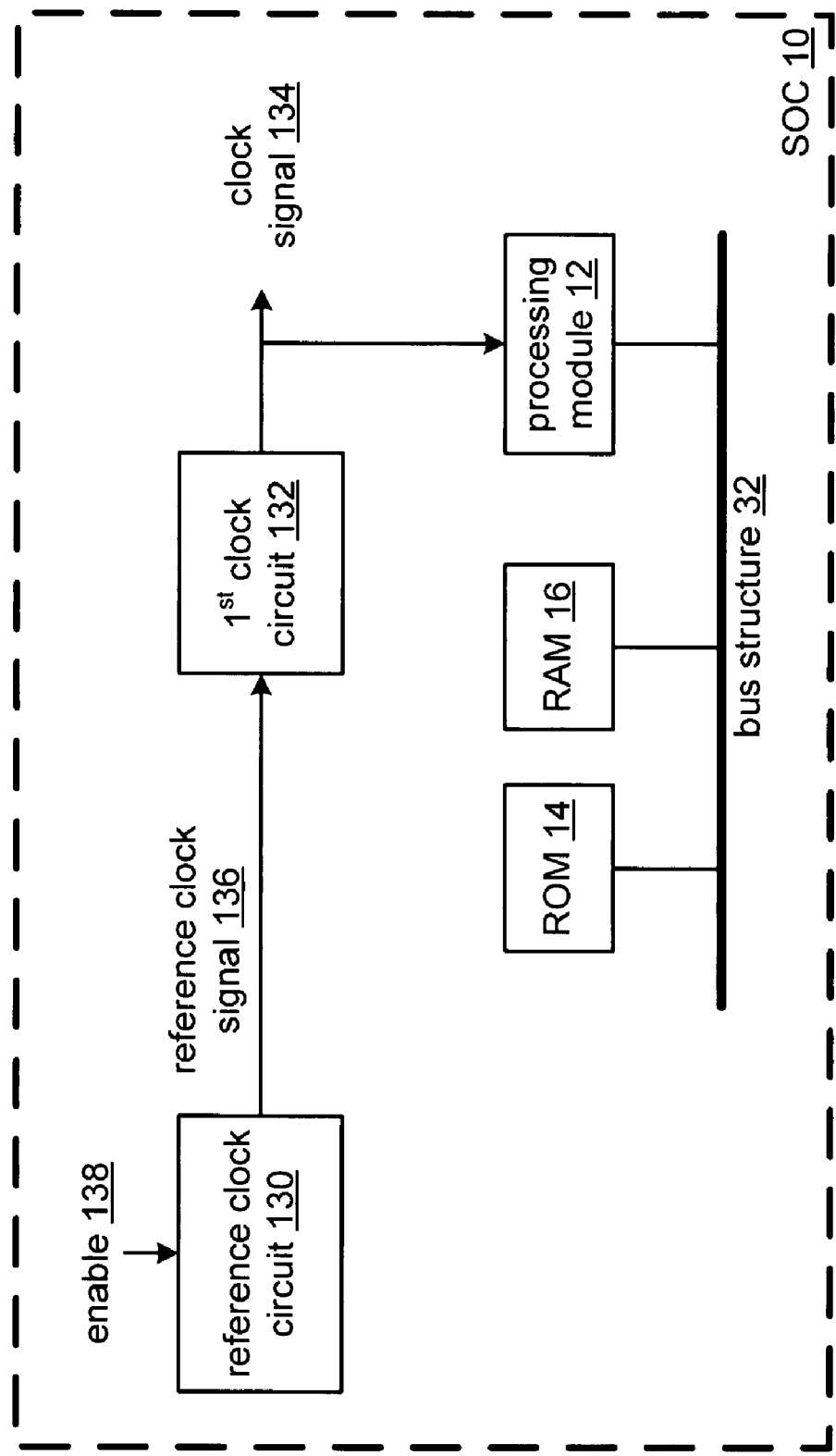
FIG. 6 is a schematic block diagram of another embodiment of an SOC in accordance with the present invention.

FIG. 6 is a schematic block diagram of another embodiment of an SOC 10 that includes a reference clock 130, a first clock circuit 132, the processing module 12, RAM 16, ROM 14, and the bus structure 32. In this embodiment, the first clock circuit 132, which may be a ring oscillator circuit, an inductor-capacitor resonating oscillator circuit, and/or a resistor-capacitor oscillator circuit, produces a clock signal 134. From time-to-time, the first clock circuit 132 tunes the clock signal 134 based on a reference clock signal 136. Note that the reference clock circuit 130, which may be a crystal oscillator circuit, a phase locked loop, and/or a counter based oscillator circuit, is enabled from time-to-time to produce the reference clock signal 136. Further note that the reference clock signal 136 is more accurate than the clock signal 134. In this manner, the SOC consumes less power since the more power consuming reference clock circuit is enabled 138 from time to time (e.g., for a few milliseconds every couple of seconds).

In one embodiment, the first clock circuit 132 tunes the clock signal 134 based on the reference clock signal 136 by comparing phase of the reference clock signal 136 with phase of the clock signal 134. When the phase of the reference clock signal 136 compares unfavorably with the phase of the clock signal 134 (e.g., they are out of phase), the first clock circuit 132 adjusts a parameter. Note that the parameter of the first clock circuit may be one or more of a biasing level (e.g., change biasing to adjust slew rate of a ring oscillator), a component value (e.g., adjust a resistive network, a capacitive network, etc.), and a supply voltage level (e.g., lower supply voltage to decrease clock speed or raise the supply voltage to increase clock speed).

In another embodiment, the first clock circuit 132 tunes the clock signal 134 based on the reference clock signal 136 by comparing frequency of the reference clock signal 136 with frequency of the clock signal 134. When the frequency of the reference clock signal 136 compares unfavorably with the frequency of the clock signal 134 (e.g., they are out of frequency step), the first clock circuit 132 adjusts a parameter.

Figure 7:
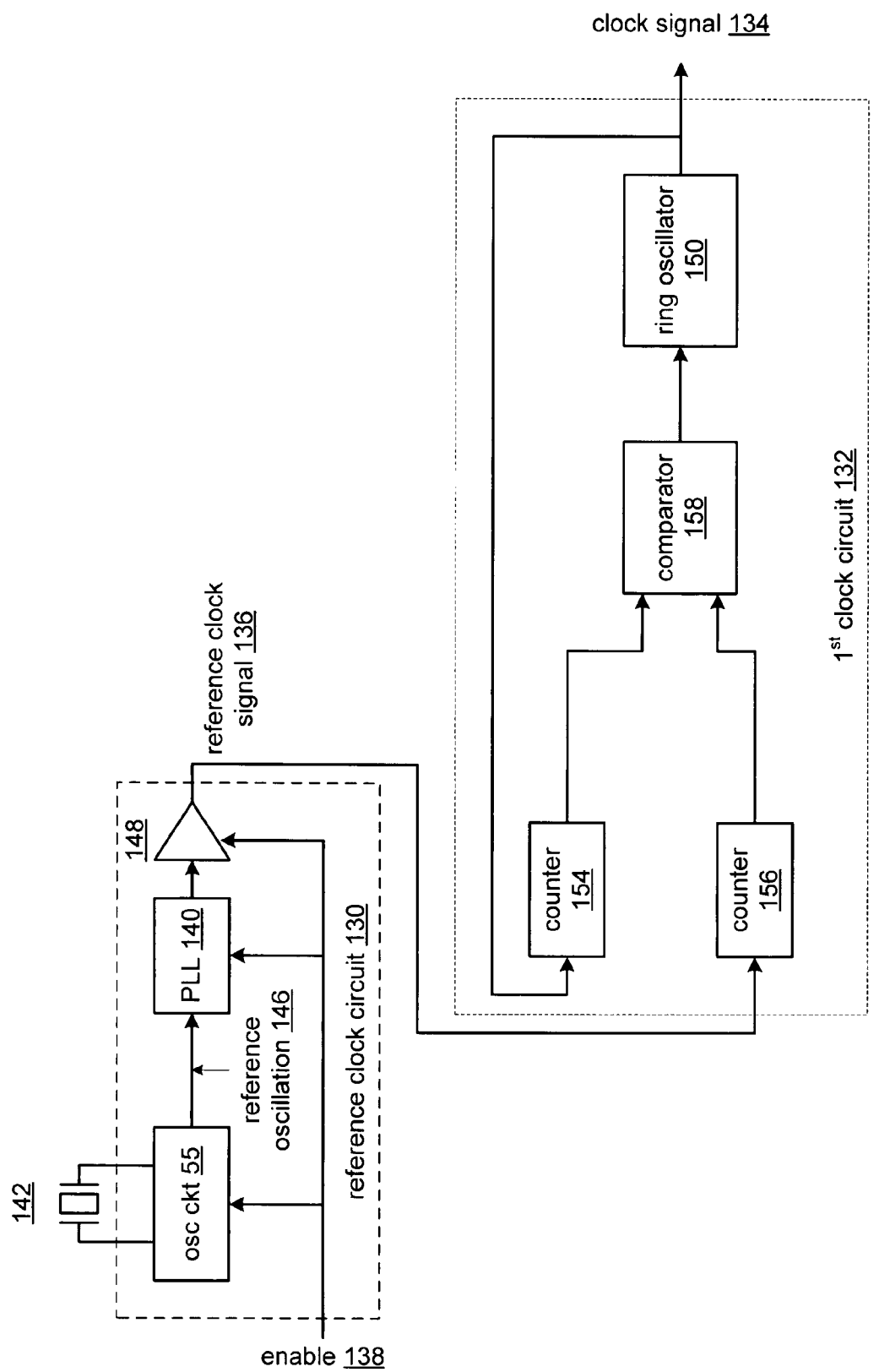
FIG. 7 is a schematic block diagram of a reference clock circuit and a first clock circuit in accordance with the present invention.

FIG. 7 is a schematic block diagram of a reference clock circuit 130 and a first clock circuit 132. The reference clock circuit 130 includes the oscillation circuit 55, a phase locked loop (PLL) 140, and a tri-state buffer 148. The first clock circuit 132 includes a ring oscillation 150, counters 154, 156, and a comparator 158. The ring oscillator 150 may include a variable number of inverter elements that are switched in and out to adjust the rate of the clock signal 134 or the ring oscillator 150 may includes a variable divider at its output to change the rate of the clock signal 134.

When the reference clock circuit 130 is enabled, the oscillation circuit 55 generates a reference oscillation 146 from a crystal 142. The PLL 148 converts the reference oscillation into the reference clock signal 136, which has a rate equal to the rate of the clock signal 134. The tri-state buffer 148 provides the reference clock signal 136 to the phase/frequency detector 154. The phase and/or frequency detector produces an up signal when the phase and/or frequency of the reference clock signal 136 leads the phase and/or frequency of the clock signal 134 and produces a down signal when the phase and/or frequency of the reference clock signal 136 lags the phase and/or frequency of the clock signal 134.

Counter 154 counts the number of cycles of the clock signal 134 and counter 156 counts the number of cycles of the reference clock signal 136 for a given number of cycles. At the end of the given number of cycles, the comparator 158 compares the counted number of clock signal cycles 134 produced by counter 154 with the counted number of reference clock 136 cycles produced by counter 156. If the number of cycles matches, the comparator 158 provides a signal to the ring oscillator 150, which does not change the operation of the ring oscillator 150. If, however, the number of cycles of the clock signal 134 is less than the number of cycles of the reference clock 138, the comparator 158 provides a signal to the ring oscillator 150 such that the ring oscillator 150 speeds up. Conversely, if the number of cycles of the clock signal 134 is greater than the number of cycles of the reference clock 138, the comparator 158 provides a signal to the ring oscillator 150 such that the ring oscillator 150 slows down.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A system on a chip (SOC) comprises:
   a bus structure;
   a processing module coupled to the bus structure;
   read only memory (ROM) coupled to the bus structure;
   random access memory (RAM) coupled to the bus structure;
   a display interface coupled to the bus structure;
   an external memory interface coupled to the bus structure;
   a digital to analog conversion (DAC) module coupled to the bus structure,
   wherein the digital to analog converter produces an analog audio signal;
   an analog to digital conversion (ADC) module coupled to the bus structure;
   a headphone amplifier circuit coupled to amplify the analog audio signal;
   a clock circuit coupled to produce a first clock signal when the SOC is in a low power mode and to produce a second clock signal when the SOC is in a performance mode, wherein the first clock signal is less accurate than the second clock signal, wherein the clock circuit consumes more power when producing the second clock signal than when producing the first clock signal, and wherein the processing module utilizes the second clock signal; and
   a bandgap circuit coupled to produce a first bandgap reference when the SOC is in the low power mode and to produce a second bandgap reference when the SOC is in the performance mode, wherein the first bandgap reference is less accurate than the second bandgap reference, and wherein a DC-DC converter is configured to utilize the first bandgap reference when the SOC is in the low power mode and to utilize the second bandgap reference when the SOC is in the performance mode.

2. The SOC of claim 1, wherein the clock circuit comprises:
   a first clock circuit to produce the first clock signal when the first clock circuit is enabled; and
   a second clock circuit to produce the second clock signal when the second clock circuit is enabled, wherein the first clock circuit is enabled when the SOC is in the low power mode and the second clock circuit is enabled when the SOC is in the performance mode.

3. The SOC of claim 2, wherein the first clock circuit comprises at least one of:
   a ring oscillator circuit;
   an inductor-capacitor resonating oscillator circuit; and
   a resistor-capacitor oscillator circuit.

4. The SOC of claim 2, wherein the second clock circuit comprises at least one of:
   a crystal oscillator circuit;
   a phase locked loop; and
   a counter based oscillator circuit.

5. The SOC of claim 1, wherein the low power mode comprises at least one of:
   fast-boot sleep mode;
   suspend mode; and
   maintenance mode.

6. The SOC of claim 1 wherein the bandgap circuit consumes more power when producing the second bandgap reference than when producing the first bandgap reference.

7. A system on a chip (SOC) comprises:
   a processing module;
   read only memory (ROM) coupled to the processing module;
   random access memory (RAM) coupled to the processing module;
   a clock circuit coupled to produce a first clock signal when the SOC is in a low power mode and to produce a second clock signal when the SOC is in a performance mode, wherein the first clock signal is less accurate than the second clock signal, wherein the clock circuit consumes more power when producing the second clock signal than when producing the first clock signal, and wherein the processing module utilizes the second clock signal;
   a DC-DC converter coupled to produce a power supply voltage from the first clock signal when the SOC is in the low power mode and from the second clock signal when the SOC is in the performance mode, wherein the DC-DC converter provides the power supply voltage to at least one of the processing module, the ROM, the RAM, and the clock circuit; and
   a bandgap circuit coupled to produce a first bandgap reference when the SOC is in the low power mode and to produce a second bandgap reference when the SOC is in the performance mode, wherein the first bandgap reference is less accurate than the second bandgap reference, wherein the bandgap circuit consumes more power when producing the second bandgap reference than when producing the first bandgap reference, and wherein the DC-DC converter utilizes the first bandgap reference when the SOC is in the low power mode and utilizes the second bandgap reference when the SOC is in the performance mode.

8. The SOC of claim 7, wherein the clock circuit comprises:

a first clock circuit to produce the first clock signal when the first clock circuit is enabled; and a second clock circuit to produce the second clock signal when the second clock circuit is enabled, wherein the first clock circuit is enabled when the SOC is in the low power mode and the second clock circuit is enabled when the SOC is in the performance mode.

9. The SOC of claim 8, wherein the first clock circuit comprises at least one of:

a ring oscillator circuit;

an inductor-capacitor resonating oscillator circuit; and a resistor-capacitor oscillator circuit.

10. The SOC of claim 8, wherein the second clock circuit comprises at least one of:

a crystal oscillator circuit;

a phase locked loop; and a counter based oscillator circuit.

11. The SOC of claim 7, wherein the bandgap circuit comprises:

a first bandgap circuit to produce the first bandgap reference when the first bandgap circuit is enabled; and a second bandgap circuit to produce the second bandgap reference when the second bandgap circuit is enabled, wherein the first bandgap circuit is enabled when the SOC is in the low power mode and the second bandgap circuit is enabled when the SOC is in the performance mode.

12. A power supply for providing a power supply voltage to a processing module, the power supply comprising:

a clock circuit coupled to produce a first clock signal when the system is in a low power mode and to produce a second clock signal when the system is in a performance mode, wherein the first clock signal is less accurate than the second clock signal, wherein the clock circuit consumes more power when producing the second clock signal than when producing the first clock signal, and wherein the second clock signal is provided to the processing module;

a bandgap circuit coupled to produce a first bandgap reference when the SOC is in the low power mode and to produce a second bandgap reference different from the first bandgap reference when the SOC is in the performance mode; and a DC-DC converter coupled to produce the power supply voltage in response to the first clock signal when the system is in the low power mode and in response to the second clock signal when the system is in the performance mode, wherein the DC-DC converter uses the first bandgap reference when the system is in the low power mode and the second bandgap reference when the system is in the performance mode.

13. The system of claim 12 wherein the first bandgap reference is less accurate than the second bandgap reference.

14. The system of claim 12 wherein the bandgap circuit consumes more power when producing the second bandgap reference than when producing the first bandgap reference.

* * * * *